(12) United States Patent
Lagrue et al.

(10) Patent No.: US 6,607,622 B2
(45) Date of Patent: Aug. 19, 2003

(54) METHOD OF APPLYING AN EXTRUDED PROFILE TO A WINDOW GLAZING

(75) Inventors: Herve Lagrue, Thionville (FR); Patrick Vandeloo, Lenningen (LU); Francis Bemtgen, Fentange (LU); Olivier Rostenne, Luxembourg (LU); Laurent Dahm, Strassen (LU); Frank Thurau, Konz (DE)

(73) Assignee: Centre Luxembourgeois de Recherches pour le Verre et la Ceramique S.A. (C.R.V.C.), Dudelange (LU)

( * ) Notice: Subject to any disclaimer, the term of this patent is extended or adjusted under 35 U.S.C. 154(b) by 113 days.

(21) Appl. No.: 09/783,402

(22) Filed: Feb. 15, 2001

(65) Prior Publication Data

US 2002/0108695 A1 Aug. 15, 2002

(51) Int. Cl.[7] .................................................. E06B 3/24
(52) U.S. Cl. ........................ 156/108; 156/297; 156/299; 428/34; 52/204.593; 52/786.12; 52/786.13; 264/173.12; 264/173.16
(58) Field of Search ................................ 156/109, 108, 156/244.11, 297, 299, 309.6, 320; 428/34; 52/204.593, 204.6, 786.13, 787.12; 264/173.12, 173.16, 174.11

(56) References Cited

U.S. PATENT DOCUMENTS

| 3,837,984 A | 9/1974 | Wagner et al. |
|---|---|---|
| 3,916,055 A | 10/1975 | Wagner |
| 4,571,278 A | 2/1986 | Kunert |
| 4,635,415 A | 1/1987 | Schumacher et al. |
| 4,668,556 A | 5/1987 | Hermann et al. |
| 4,755,339 A | 7/1988 | Reilly et al. |
| 4,826,417 A | 5/1989 | Reilly et al. |
| 4,876,132 A | 10/1989 | Kunert |
| 4,879,853 A | 11/1989 | Braendle et al. |
| 4,910,071 A | 3/1990 | Kunert |
| 4,933,032 A | 6/1990 | Kunert |
| 5,057,265 A | 10/1991 | Kunert et al. |
| 5,095,669 A | 3/1992 | Kunert et al. |
| 5,108,526 A | 4/1992 | Cornils et al. |
| 5,154,028 A | 10/1992 | Hill et al. |
| 5,234,730 A * | 8/1993 | Lautenschlaeger et al. . 156/109 |
| 5,350,211 A | 9/1994 | Yada et al. |
| 5,396,746 A | 3/1995 | Whitmer |
| 5,401,449 A | 3/1995 | Hill et al. |

(List continued on next page.)

FOREIGN PATENT DOCUMENTS

| EP | 0 748 683 | 12/1996 |
|---|---|---|
| WO | WO 99/34966 | 7/1999 |

OTHER PUBLICATIONS

A. Raybond, Systemes De Collage Technique, (English Version), pp. 1–11.

Primary Examiner—Michael W. Ball
Assistant Examiner—Jessica Rossi

(57) ABSTRACT

A method for adhering/bonding a frame profile (e.g., weather strip, water seal, spacer, etc.) to a substrate (e.g., glass or plastic substrate) in the context of a vehicle window unit. A frame profile is formed via extrusion so as to include both a polymer profile portion and a selectively activatable interface or adhesive portion. Following extrusion, the frame profile may be stored, cut, trimmed, cure, etc. At some point following extrusion, the interface/adhesive is in a non-activated state, or at least in a state where it is not activated to an extent sufficient to bond/adhere the frame to the substrate. To adhere/bond the frame profile to the substrate, the interface/adhesive portion of the frame profile is activated (e.g., heat activated). Following and/or during heat activation, the frame profile is pressed against the substrate, or vice versa, so that the activated adhesive bonds the polymer profile to the substrate.

18 Claims, 9 Drawing Sheets

U.S. PATENT DOCUMENTS

| | | |
|---|---|---|
| 5,440,849 A | 8/1995 | Agrawal et al. |
| 5,443,673 A | 8/1995 | Fisher et al. |
| 5,519,979 A | 5/1996 | Kunert et al. |
| 5,527,083 A | 6/1996 | Kreye |
| 5,547,359 A | 8/1996 | Cordes et al. |
| 5,552,194 A | 9/1996 | Ito et al. |
| 5,554,325 A | 9/1996 | Kotte et al. |
| 5,571,461 A | 11/1996 | Scholl et al. |
| 5,632,939 A | 5/1997 | Ito et al. |
| 5,693,174 A | 12/1997 | Nakata et al. |
| 5,744,172 A | 4/1998 | Todaka et al. |
| 5,752,342 A | 5/1998 | Kreye |
| 5,897,937 A | 4/1999 | Cornils et al. |
| 5,908,595 A | 6/1999 | Cornils et al. |
| 5,914,083 A | 6/1999 | Yada et al. |
| 5,931,523 A | 8/1999 | Kreye |
| 6,025,438 A | 2/2000 | Hinterwaldner et al. |
| 6,083,558 A | 7/2000 | Bremont |
| 6,203,639 B1 | 3/2001 | Swanson et al. |
| 6,355,127 B1 * | 3/2002 | Mahdi et al. ................ 156/155 |

* cited by examiner

METHOD OF APPLYING AN EXTRUDED PROFILE TO A WINDOW GLAZING

This invention relates to a method of making a window unit for use in vehicles such as cars, trucks, sport utility vehicles (SUVs), and the like. In particular, this invention relates to a method of making a window unit by applying an extruded (e.g., coextruded) polymeric frame profile to a substrate (e.g., glass substrate) This profile includes an interface layer portion which may be a selectively activatable adhesive (e.g., heat activatable adhesive). When it is desired to bond the frame profile to a substrate, the interface layer portion is activated (e.g., heat activated) and the frame profile is pressed toward or against the substrate so that the activated interface portion (e.g., activated adhesive) bonds the polymer profile to the substrate (either directly or indirectly). Certain embodiments of this invention also relate to the resulting vehicle window unit.

BACKGROUND OF THE INVENTION

It is known to provide a glass substrate with a frame-like polymer profile proximate an edge portion thereof. For example, see U.S. Pat. Nos. 5,108,526; 5,057,265; 5,527,083; 5,154,028; 4,933,032; and 4,826,417, the disclosures of which are all hereby incorporated herein by reference.

Polymer profiles may be extruded onto a glass substrate and thereafter cured. See U.S. Pat. Nos. 5,108,526 and 5,057,265. Extruded frame profiles affixed to a glass surface may, for example, be used as an intermediate body (or spacer) to which an adhesive bead is applied during the assembly of automotive windows, where the bead bonds the profile to a corresponding window frame of the vehicle (e.g., see the '265 patent). Frame profiles may also be designed to limit the spread of adhesive along a major surface of a glass substrate (e.g., see the '032 patent). Extruded profiles may also include a lip that may be used either for centering purposes (e.g., see the '265 patent), or alternatively as a weatherstrip (e.g., water seal) and/or gap covering unit.

FIG. 1 illustrates a known polymer profile frame (same as frame profile herein) bonded to a glass substrate in a vehicle window application. In particular, the window assembly includes glass substrate 1 provided in a window frame including attachment flanges 3 that runs approximately parallel to the substrate surface and wall(s) 4 that is aligned at an angle of from about 45 to 135 degrees relative to flange(s) 3. Polymer profile 5 including lip 7 is provided on a major surface 9 of glass substrate 1. Optionally, opaque layer 11 (e.g., frit layer, baked black/dark enamel layer, etc.) may be provided so that polymer profile 5 is on the surface 9 of substrate 1 with layer 11 therebetween. Adhesive 27 bonds the substrate 1 to the metal window frame 3, 4.

Referring to FIGS. 1 and 4 herein, U.S. Pat. No. 5,108,526 teaches extruding a polymer profile frame 5 directly onto the surface of a glass plate or substrate 1, with the polymer profile 5 thereafter curing. As shown in FIG. 4, socket 17 of extrusion die 13 is connected to a polymer supply tube so as to enable polymer to flow into supply channels 19 and 21. The two supply channels 19, 21 empty into distributing chamber 23. Optionally, channel 21 may be adjusted via screw 25. Polymer material flows through channels 19 and/or 21 and into chamber 23. From distributing chamber 23, the molten polymer flows through orifice 15 and onto the substrate. Unfortunately, the system/method of the '526 patent requires the presence of the extruder at the glass so that the profile is deposited on the glass immediately after leaving the extruder. This may often be undesirable, and unduly burdensome and/or complicated in certain environments/applications.

As shown in FIGS. 2–3, it is also known to extrude polymer profiles 5 of other shapes onto glass substrates 1 proximate edge(s) 25 of the substrate 1. In FIG. 2, profile or profile frame 5 keeps adhesive 27 from flowing over the edge of the substrate, while in FIG. 3 the pair of profile frames 5 keep the adhesive 27 positioned therebetween and prevent it from flowing across the substrate. Adhesive 27 is used to adhere the glass substrate 1 to a corresponding vehicle window frame 3, 4. Again, when profile(s) 5 are extruded onto the glass in such a manner, this unfortunately requires the presence of the extruder at the glass because the profile(s) is deposited on the glass immediately after leaving the extruder.

U.S. Pat. No. 4,826,417 discloses a method for applying a polymer profile to a glass substrate via a reaction injection molding (RIM) process. Unfortunately, the process of the '417 patent requires placing the glass substrate itself at least partially within the mold. Again, this may often be undesirable and/or unduly burdensome in certain environments/applications.

U.S. Pat. No. 5,527,083 discloses a polymer profile frame at the edge of a glass substrate. In the '083 patent, the polymer profile includes a plurality of apertures therein. After placing the profile on the glass substrate, liquid adhesive is poured into the apertures in the profile so as to contact the substrate at the bottom of the apertures. Thus, when the adhesive hardens it bonds the profile to the substrate. Unfortunately, this requires the use of liquid adhesive in order to bond the profile to the substrate.

U.S. Pat. No. 4,933,032 teaches coextruding a profile including first and second portions directly onto a glass substrate. Unfortunately, the system/method of the '032 patent requires the presence of the extruder at the glass so that the profile is deposited on the glass immediately after leaving the extruder. This may often be undesirable.

U.S. Pat. No. 5,552,194 teaches extruding a profile including first and second portions directly onto a glass substrate (i.e., an adhesive and a molding material, respectively). Unfortunately, the system/method of the '194 patent requires the presence of the extruder at the glass so that the profile is deposited on the glass immediately after leaving the extruder. This may often be undesirable.

In view of the above, it will be apparent to those skilled in the art that there exists a need in the art for a system/method that enables an extruded polymer profile to be more easily attached/bonded to a substrate (e.g., glass substrate). There also exists a need in the art for a method which allows the profile to cure prior to being adhered to the substrate. There also exists a need in the art for a method which enables an extruded polymer profile to be modified (e.g., cut, trimmed, etc.) or stored prior to being adhered to the substrate.

SUMMARY OF THE INVENTION

It is an object of this invention to provide a method for more easily bonding an extruded profile to a substrate (the profile may be adhered either directly to the surface(s) of the substrate, or alternatively one or more frit/primer layers may be provided therebeteween—in either event the profile or frame profile is adhered/bonded "to the substrate").

Another object of this invention is to coextrude a profile frame including both a polymer profile portion and an activatable adhesive portion. After the frame has been coextruded, it optionally may be stored, trimmed, cut, and/or cured. Thereafter, when it is time to adhere/apply the profile frame to the substrate (e.g., glass or plastic substrate), the adhesive is activated (e.g., heat activated, ultrasonically activated, etc.). After (or while) the adhesive is activated, the profile frame is pressed against the substrate so that the adhesive can bond the polymer profile portion of the frame to the substrate either directly or indirectly.

Another object of this invention is to adhere/bond an extruded profile to a substrate without having to apply the profile to the substrate immediately upon the profile exiting the extruding die.

Another object of this invention is to fulfill one or more of the aforesaid object(s) and/or need(s).

Generally speaking, certain embodiments of this invention fulfill one or more of the above-listed needs and/or objects by providing a method of making a vehicle window unit, the method comprising:

providing a glass substrate;

extruding a frame profile including a polymer profile portion and a selectively activatable interface or adhesive portion;

allowing the frame profile to cure;

heating the selectively activatable interface portion of the frame profile in order to activate the interface portion; and pressing the frame profile toward the substrate, or vice versa, proximate an edge thereof when the interface portion is activated in order to adhere or bond the frame profile to the substrate via at least the interface portion thereby forming the vehicle window unit.

Still further embodiments of this invention fulfill one or more of the above-listed objects and/or needs by providing a vehicle window comprising:

a glass substrate having a peripheral edge;

an extruded frame profile provided on said glass substrate proximate the edge thereof, said extruded frame profile including (a) a polymer profile portion including a flexible lip portion extending from a base portion, and (b) a thermoplastic interface or heat activatable adhesive portion; and wherein said extruded frame profile is bonded to the substrate by heat activating the adhesive or interface portion.

Still further embodiments of this invention fulfill one or more of the above-listed objects and/or needs by providing a method of making a vehicle window unit, the method comprising:

providing a glass substrate;

coextruding a frame profile including a polymer profile portion of a first material and a selectively activatable interface layer portion of a second material, so that the polymer profile portion and the interface portion are bonded to one another;

allowing the polymer profile portion and the interface portion of the coextruded frame profile to cure;

heating the selectively activatable interface layer portion of the frame profile in order to activate an adhesive of the interface layer portion; and pressing the frame profile toward the substrate proximate an edge thereof after said heating when the interface layer portion is activated in order to adhere or bond the frame profile to the substrate thereby forming the vehicle window unit.

DETAILED DESCRIPTION OF CERTAIN EMBODIMENTS OF THIS INVENTION

Figure 1:
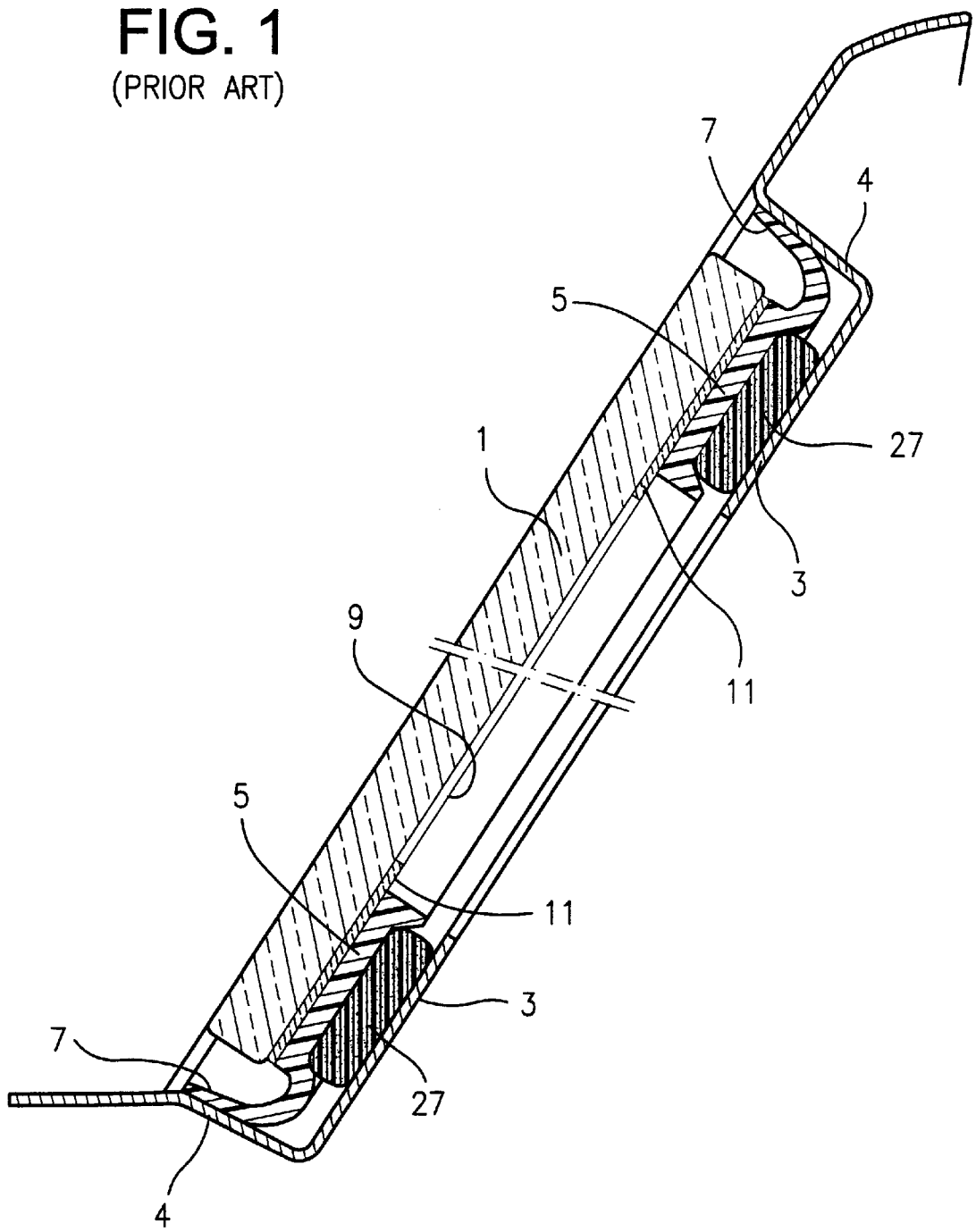
FIG. 1 cross sectional view of a conventional vehicle window unit.
Figure 2:
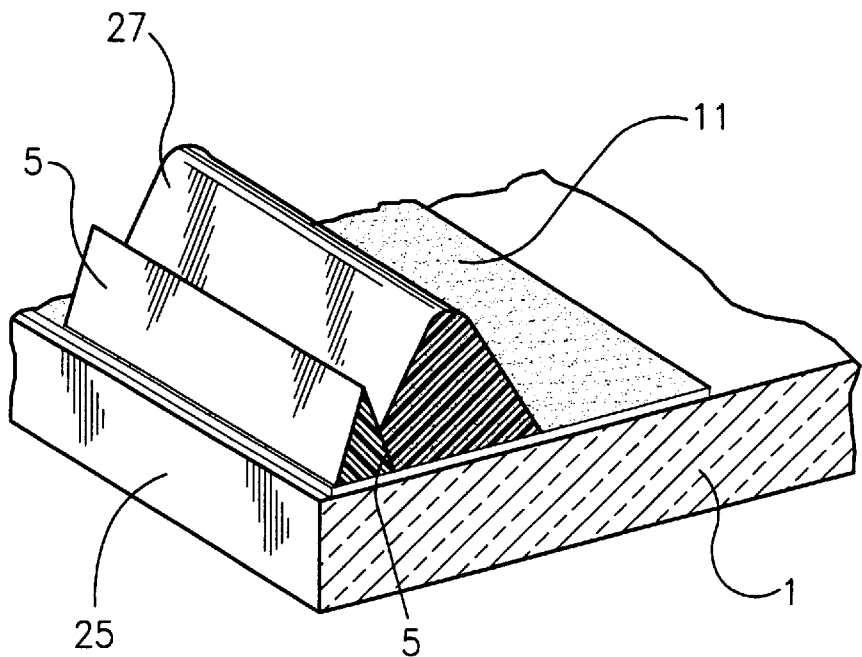
FIG. 2 is a perspective partial cross sectional view of a portion of another known vehicle window unit.
Figure 3:
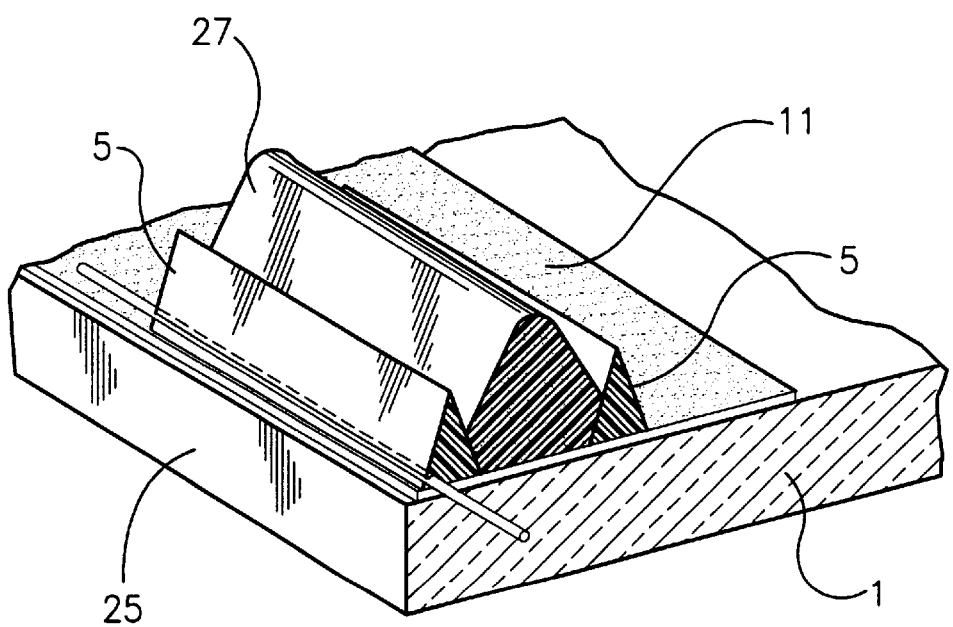
FIG. 3 is a perspective partial cross sectional view of a portion of yet another known vehicle window unit.
Figure 4:
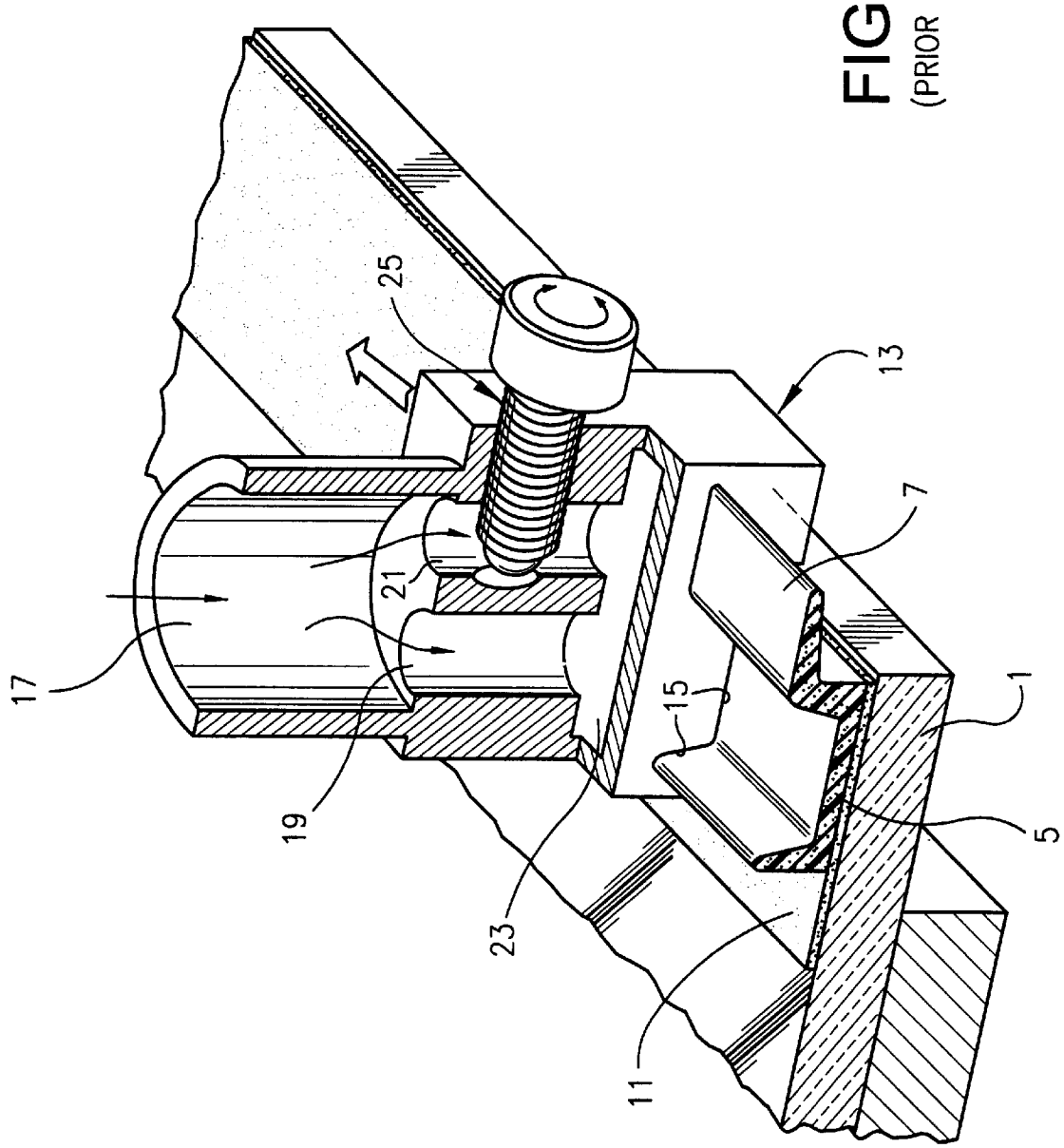
FIG. 4 is a perspective partial cross sectional view of a conventional extruder which may be used to extrude the polymer frame profile of FIG. 1 immediately onto a glass substrate.

In the following description, for purposes of explanation and not limitation, specific details are set forth in order to provide an understanding of certain embodiments of the present invention. However, it will be apparent to those skilled in the art that the present invention may be practiced in other embodiments that depart from these specific details. In other instances, detailed descriptions of well known devices, processes, techniques, and methods are omitted so as to not obscure the description with unnecessary detail. Referring now more particularly to the accompanying drawings, in which like reference numerals indicate like parts/elements throughout the several views.

The instant invention provides a method for adhering/bonding a frame profile (e.g., weather strip, water seal, spacer, etc.) to a substrate (e.g., glass or plastic substrate, or vehicle body panel) in the context of a vehicle window unit. In accordance with certain embodiments of this invention, a frame profile is formed via extrusion (the terms "extrusion" and "extruded" as used herein include both extrusion of a single layer as well as coextrusion of multiple layers) so as to include both a polymer profile portion and a selectively activatable interface portion. In certain embodiments, the interface portion may include or be of a selectively activatable adhesive portion/material. Following extrusion, the frame profile may be stored, may be cut, may be trimmed, may be allowed to cure (fully or partially), etc. At some point following extrusion, the interface portion (e.g., heat activatable adhesive portion) is in a non-activated state, or at least in a state where it is not activated to an extent sufficient to bond/adhere the frame to the substrate. When it is desired to adhere/bond the frame profile to the window substrate, the interface portion of the frame profile is activated (e.g., heat activated). Following and/or during heat activation, the frame profile is pressed against at least a major surface of the substrate so that the activated adhesive of the interface portion ends up adhering/bonding the polymer profile to the substrate (directly or indirectly). Subsequently, the substrate with profile thereon may be installed into an appropriate window frame of a vehicle in order to form a vehicle window assembly.

Figure 5:
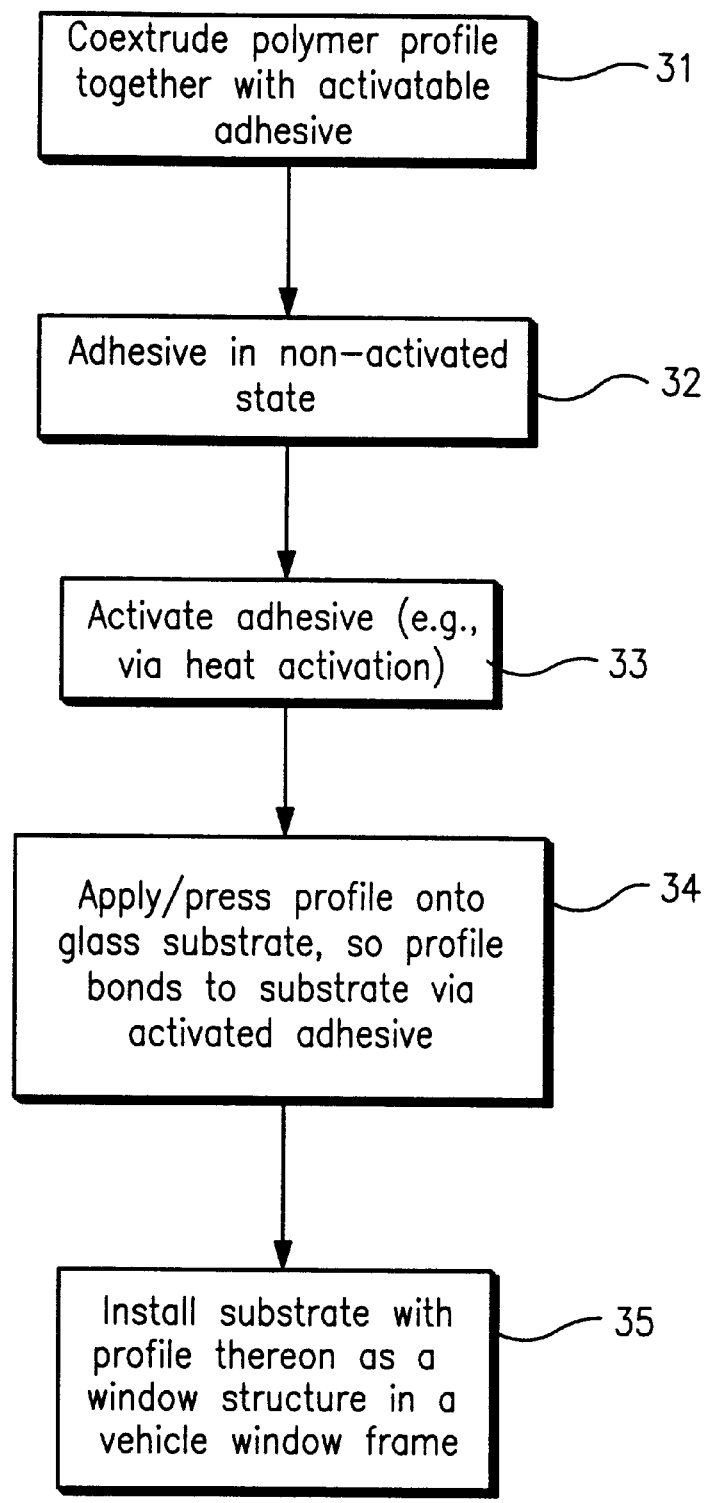
FIG. 5 is a flowchart illustrating steps taken in accordance with an embodiment of this invention.

FIG. 5 is a flowchart illustrating certain steps taken in the manufacture of a vehicle window unit in accordance with an exemplary embodiment of this invention. To begin with, a frame profile is extruded (e.g., extruded using a single material, or coextruded using different materials) so as to form a frame profile including a polymer profile portion and a selectively activatable interface portion (step 31). As stated above, the interface portion may include or be of a selectively heat activatable adhesive. Following the extrusion, the interface portion (e.g., adhesive) is in a non-activated or inactive state (step 32). In coextrusion embodiments, the two portions are bonded/adhered to one another immediately after leaving the coextruder. One and/or both portion(s) are permitted to partially or fully cure. Thereafter, optionally the frame profile may be cut, trimmed, or otherwise adjusted/modified so as to make it conform to the shape desired for adherence to a substrate. When it is time to adhere the profile to a substrate, the interface portion is activated (step 33). In different embodiments of this invention, the interface portion may be activated by heat (e.g., IR heat, UV heat, microwave heat, or other heat), ultrasonic waves, vibrational welding, or any other suitable means, so as to become active as an adhesive. When the interface/adhesive portion of the frame profile is active (i.e., immediately after or during the activation), the frame profile is pressed against or toward the substrate (or vice versa) to perfect the adhering/bonding (step 34). Heat for activating the interface or adhesive portion may hit the profile (a) at the contact point where the profile is on the substrate (with or without primer), and/or (b) before the profile makes contact with the substrate or a primer thereon. Upon curing of the interface portion/adhesive, the polymer profile portion is adhered/bonded to the substrate via the interface/adhesive portion. Subsequently, the substrate with profile thereon may be installed in a suitable vehicle window frame using additional adhesive in order to form a vehicle window assembly (step 35).

Figure 6:
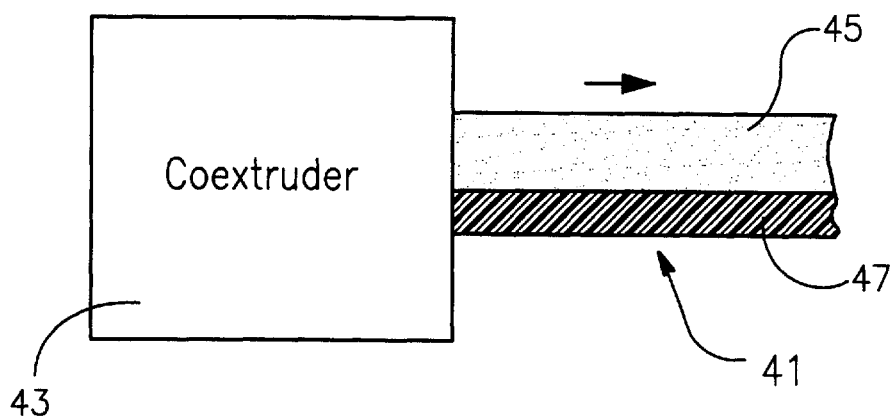
FIG. 6 is a schematic partial cross sectional diagram illustrating a frame profile being coextruded in accordance with the FIG. 5 embodiment of this invention.

FIG. 6 illustrates a coextruded embodiment of this invention. In FIG. 6, frame profile 41 is coextruded from coextruding die/device 43. Pre-formed frame profile 41 includes both polymer profile portion 45 and interface portion which may be of or include selectively activatable adhesive 47. As for the coextruder, any suitable coextruding device 43 will suffice. During coextrusion, the different materials for portions 45 and 47 may be heated to temperatures of from about 200 to 500 degrees F.

Polymer profile portion 45 may include or be of any suitable polymer material, including but not limited to polyurethane (PU) (one or multiple component), polyvinyl chloride (PVC), thermoplastic rubber (TPR), thermoplastic urethane, thermoplastic olefin (TPO), and/or thermoplastic elastomer (TPE). In certain embodiments, polymer profile portion 45 is preferably made of or includes a TPE such as Santoprene. Interface portion 47 may be of or include a material different than portion 45, or alternatively may be of or include the same material as portion 45 so that in some exemplary non-limiting embodiments interface portion 47 may be of or include a polymeric selectively activatable adhesive material (e.g., thermoplastic) such as Santoprene.

Figure 7:
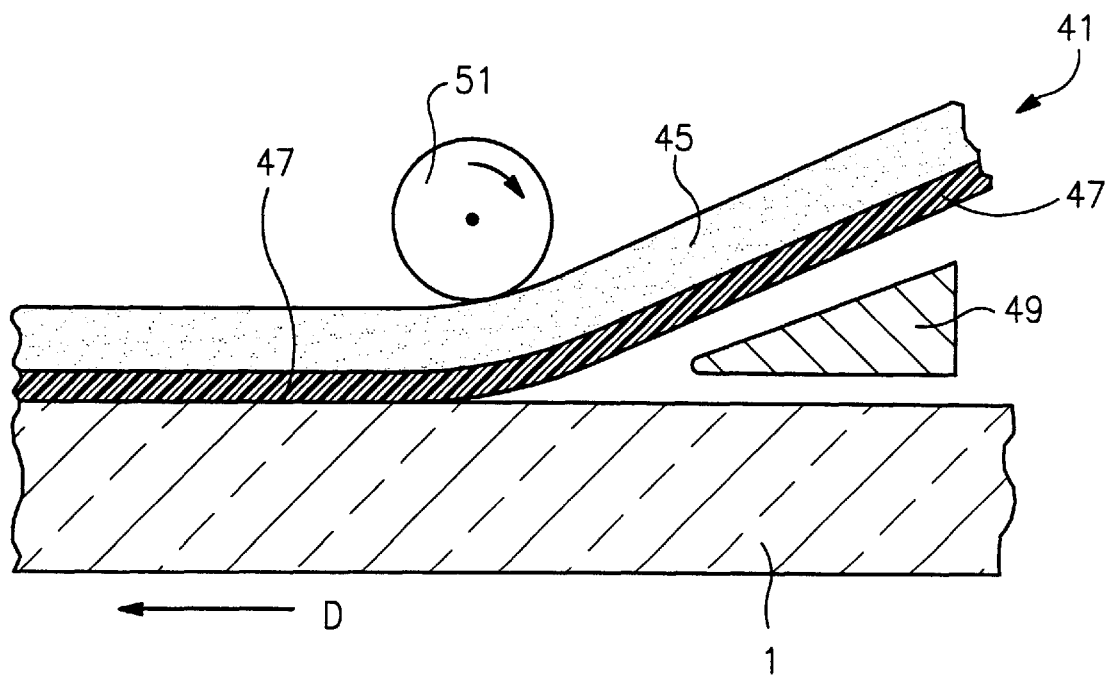
FIG. 7 is a cross sectional view illustrating a method of adhering a coextruded frame profile to a substrate in accordance with the FIG. 5 and/or FIG. 6 embodiment(s) of this invention, where a heating element is provided in order to activate the adhesive portion of the coextruded frame profile.
Figure 8:
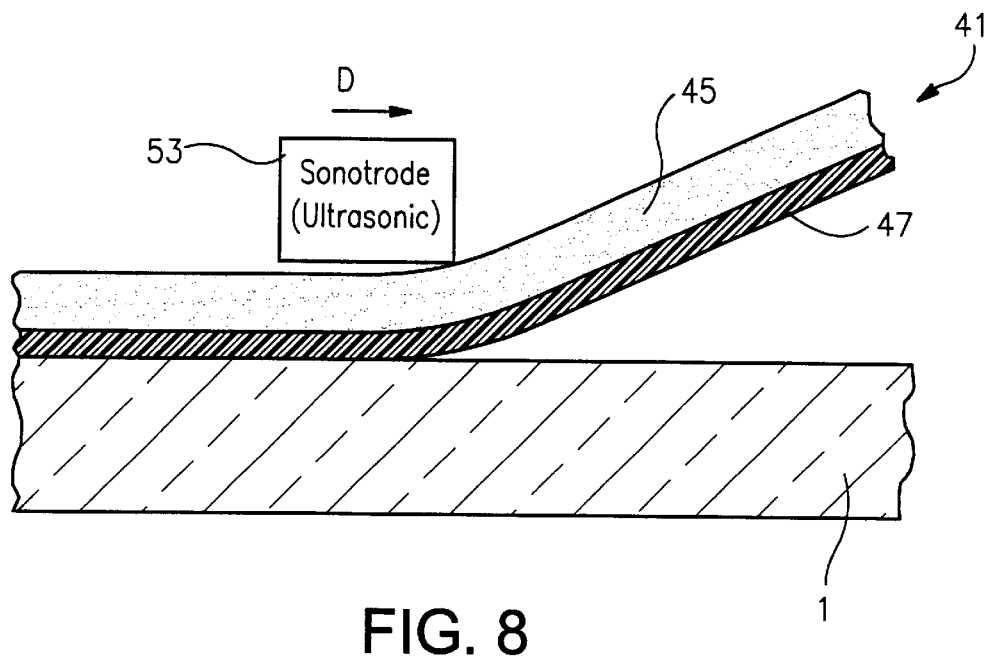
FIG. 8 is a cross sectional view illustrating another method of adhering a coextruded frame profile to a substrate in accordance with the FIG. 5 and/or FIG. 6 embodiment(s) of this invention, wherein an ultrasonic device (e.g., sonotrode) is provided for activating the adhesive portion of the coextruded frame profile.
Figure 9:
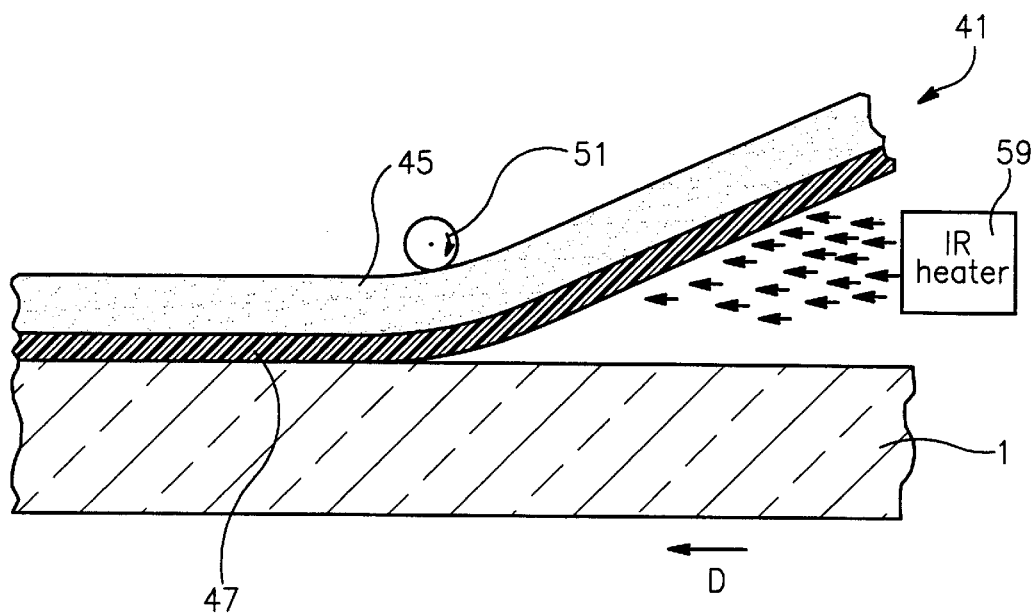
FIG. 9 is a cross sectional view illustrating yet another method of adhering a coextruded frame profile to a substrate in accordance with the FIG. 5 and/or FIG. 6 embodiment(s) of this invention, wherein an infrared (IR) heater is provided for activating the adhesive portion of the coextruded frame profile.

FIGS. 7–9 illustrate different techniques which may be used in adhering/bonding a coextruded profile frame 41 to a substrate in different embodiments of this invention.

In the FIG. 7 embodiment, substrate 1 (e.g., glass or plastic substrate) and coextruded profile frame 41 are moved together in direction "D" so that substrate 1 passes under heating element 49 while flexible profile frame 41 passes over top of heating element 49. Heating element 49 may be any suitable heating element which generates heat (e.g., electric heater, gas heater, etc.). As profile frame 41 passes over or adjacent heater 49, the heat generated from element 49 impinges upon interface portion 47 (e.g., heat activatable adhesive portion) of the profile frame 41 and causes same to be activated. At this time, the interface portion 47 is heated to a temperature of about 400 to 600 degrees F., more preferably to about 430 degrees F. in order to activate the same. Shortly after the interface portion 47 is heat activated, the profile frame passes under press roller 51 which presses the profile frame (i.e., polymer profile portion 45 and interface/adhesive portion 47) downward toward or against substrate 1 in order to cause the profile frame 41 (including portion 45) to adhere/bond to the substrate 1 via interface/adhesive portion 47. Profiles may be applied along only one edge or side of substrate 1 in certain embodiments (e.g., for a vehicle windshield), but in other embodiments may be applied around the entire circumference or edge (i.e., four sides) of the substrate in other embodiments (e.g., vehicle backlite or rear window embodiments). After interface/adhesive portion 47 cures, the substrate and profile are adhered/bonded to one another and the combination may subsequently be installed in a window frame of a vehicle to form a vehicle window assembly.

In the FIG. 8 embodiment, extruded profile frame 41 (e.g., of any of FIG. 6, 12 or 13) is positioned/held at an angle to substrate 1 (e.g., glass or plastic substrate) and ultrasonic wave emitting device 53 is moved in direction "D" across the profile 41. As ultrasonic wave emitting device 53 crosses over top of flexible profile frame 41, it both emits ultrasonic waves to activate the interface/adhesive portion 47 and presses downward on the profile 41 so as to cause the profile to be bonded/adhered to the substrate 1 via interface/adhesive portion 47. Profiles 41 may be applied along only one edge or side of substrate 1 in such a manner (e.g., for a vehicle windshield), but in other embodiments may be applied around the entire circumference or edge (i.e., four sides) of the substrate in other embodiments (e.g., vehicle backlite or rear window embodiments). After adhesive portion 47 cures, the substrate and profile are adhered/bonded to one another and the combination (i.e., the vehicle window unit) may subsequently be installed in a window frame of a vehicle to form a vehicle window assembly.

In the FIG. 9 embodiment, substrate 1 (e.g., glass or plastic substrate) and extruded profile frame 41 (e.g., the profile frame 41 of any of FIG. 6, 12 or 13) are moved together in direction "D." Infrared (IR) rays from IR heater impinge upon interface/adhesive portion 47 of the profile frame 41 and causes same to be activated. Shortly after the adhesive portion 47 is heat activated, the profile frame passes under press roller 51 which presses the profile frame (i.e., polymer profile portion 45 and adhesive portion 47) downward toward or against substrate 1 in order to cause the profile frame 41 (including portion 45) to adhere/bond to the substrate 1 via interface/adhesive portion 47. After interface/ adhesive portion 47 cures, the substrate and profile are adhered/bonded to one another and the combination (i.e., the vehicle window unit) may subsequently be installed in a window frame of a vehicle to form a vehicle window assembly.

Profile frames 41 may be adhered/bonded directly to a surface of the substrate 1 in any of the embodiments of FIGS. 7–9 or 12–13. However, more preferably, an opaque layer(s) (e.g., black enamel, frit, primer, silk-screen, etc.) 11 is provided on a major surface(s) of the substrate proximate at least an edge portion thereof so that the profile frames 41 in any of the embodiments of FIGS. 7–9 or 12–13 may be adhered/bonded to a surface of the substrate with this opaque layer being provided therebetween. Preferably, profiles herein are bonded to substrates 1 so as to be located proximate (e.g., with about 2 inches) the most closely adjacent edge of the substrate in certain embodiments as is known in the art.

Figure 10:
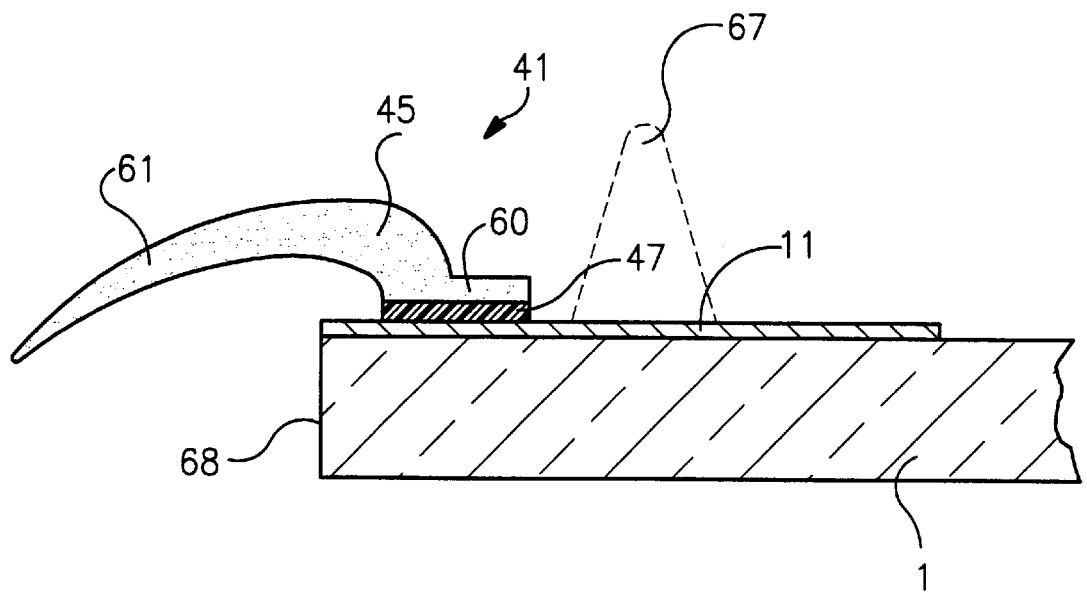
FIG. 10 is a side cross sectional view of a frame profile adhered to a substrate in accordance with one or more of the embodiments of FIGS. 5–9 of this invention.

FIG. 10 is a side cross sectional view of an edge of a resulting profile bonded to substrate (i.e., from any of the embodiments of FIGS. 5–9 or 12–13). The unit includes substrate 1 (preferably of glass) upon which (i) optional opaque frit and/or primer layer(s) 11, and (ii) profile 41 (including polymer profile portion 45 and interface/adhesive portion 47) are provided. In the FIG. 10 embodiment, the polymer profile portion 45 includes base portion 60 and flexible lip 61. Lip 61 may function as a weather seal and/or for aesthetic purposes when resting against a corresponding vehicle window frame. The unit of FIG. 10 may be bonded to a corresponding vehicle window frame 3, 4 using additional adhesive 67. As with the other embodiments herein, profile 41 may be provided adjacent or proximate the edge 68 of the substrate around the entire periphery thereof (i.e., four sided profile) in some embodiments, while in other embodiments profile 41 may only be provided along one, two, or three sides of the window substrate 1.

Figure 11:
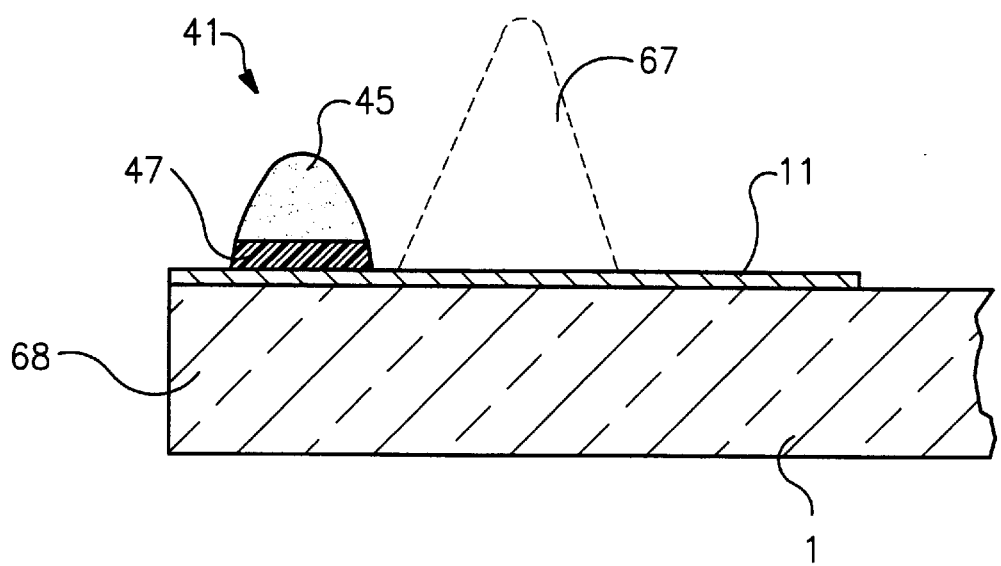
FIG. 11 is a side cross sectional view of another frame profile adhered to a substrate in accordance with one or more of the embodiments of FIGS. 5–9 of this invention.

FIG. 11 is a side cross sectional view of an edge of another resulting profile bonded to a substrate (i.e., from any of the embodiments of FIGS. 5–9 or 12–13). This embodiment differs from the FIG. 10 embodiment in that profile frame 41 does not have a lip. Instead, profile 41 may function to (i) limit the flow of additional adhesive 67, (ii) contact a window frame 3 so as to space the substrate 1 from the frame 3, and/or (iii) support an additional glue portion used for securing the window unit to a vehicle window frame. Accordingly, those skilled in the art will recognized that the embodiments of this invention apply to many differently shaped profiles 41.

Figure 12:
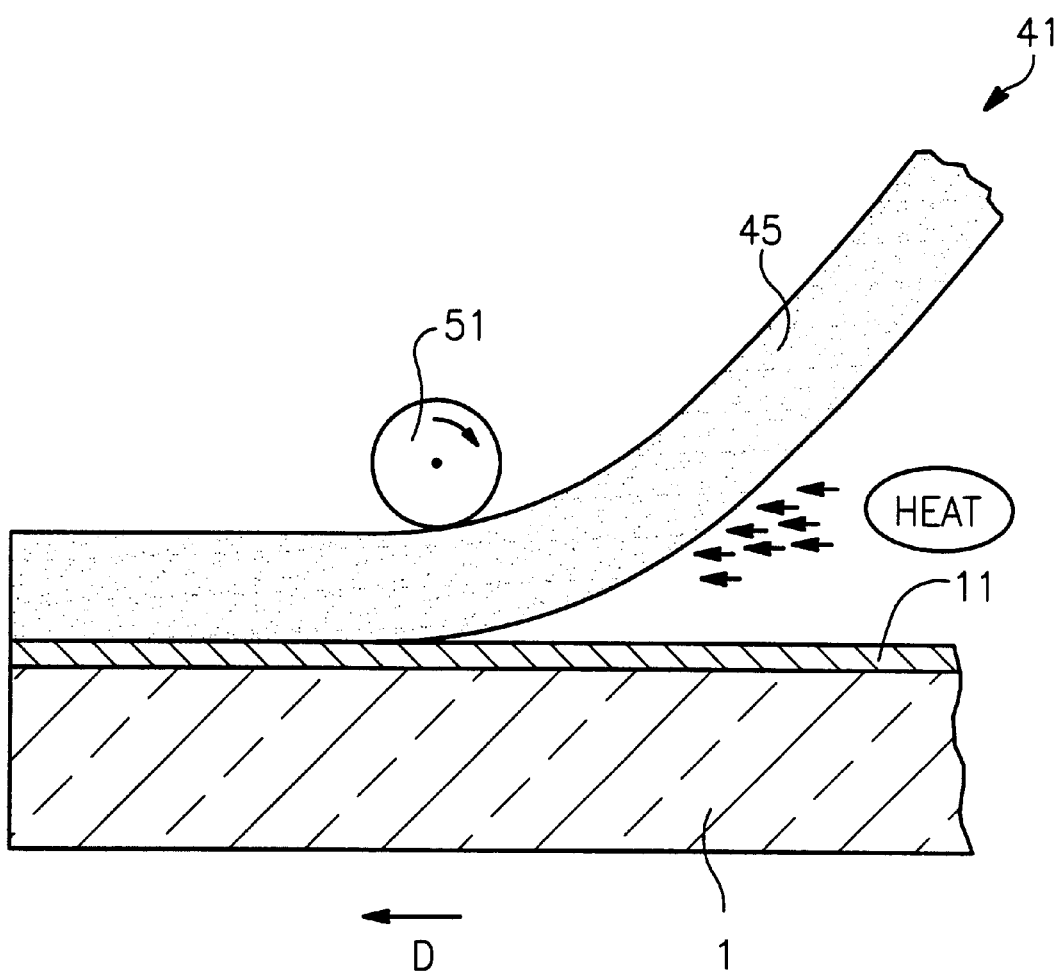
FIG. 12 is a cross sectional view illustrating a method of adhering an extruded frame profile to a substrate in accordance with another embodiment(s) of this invention, where coextrusion need not be used.

FIG. 12 illustrates another embodiment of this invention where coextrusion need not be used. In this embodiment, profile 41 (e.g., of or including TPE) is extruded from an extruder and allowed to cure (partially or fully). It may be stored, cut, etc. Thereafter, the profile or polymer profile portion 41, 45 is guided toward substrate 1 as discussed previously, and a lower surface thereof is heated. In this embodiment, the lower surface of the profile 41, 45 is considered the interface layer portion which may be selectively heat activatable. The lower surface or interface portion of the profile may be heated in any of the manners illustrated and/or discussed above. Heating the interface portion causes the TPE to deform slightly and/or at least partially melt at the lower surface thereof, thereby causing the interface portion or lower surface of the TPE profile to bond to substrate 1 either directly or via primer layer 11. Heat may impinge upon or hit the profile 41 (a) at the contact point where the profile (e.g., the interface portion of the profile) is contacting the primer 11 or substrate 1, and/or (b) before the profile makes contact with the primer or substrate. Pressure is applied via roller 51 as discussed above. In such a manner, coextrusion may be avoided in certain embodiments of this invention.

Two examples of the FIG. 12 embodiment are as follows. In the first example, a lip 61 inclusive profile frame 41 of TPE Santoprene is extruded. A primer 11 (e.g., Gepoprime II available from GEPOC, Germany) is provided on the surface of substrate 1. The glass substrate 1 with primer 11 thereon is preheated to a temperature of from about 70 to 200 C., more preferably about 100 degrees C. Heat is applied to the interface portion (or lower portion) of profile 41 as shown in FIG. 12 to melt and/or deform the interface layer portion of the profile, so that the interface portion is heated to a temperature of from about 150 to 300 degrees C., more preferably from about 170 to 220 degrees C., and most preferably about 180 degrees C. (i.e., to an activation temperature). The profile 41 is then applied on the glass substrate as shown in FIG. 12, and pressed toward the substrate and primer 11 in order to bond/adhere the profile 41 to the substrate 1. Primer layer 11 is of course located between the profile 41 and substrate 1. Upon the interface layer portion of profile 41 curing/cooling, the profile 41 is bonded/adhered to the substrate.

The second example of the FIG. 12 embodiment is the same as the aforesaid first example, except that the profile 41 is applied to or laid down on the substrate 1 over primer 11 before the activation heat is applied to the profile. After being applied to the substrate, the activation heat is directed toward the interface portion of the profile in order to heat and activate same (to the temperatures discussed above). For example, see FIG. 13, which is to be discussed below. When or just after the interface portion is heated, the profile 41 is pressed toward the substrate, or vice versa, so that when the interface portion cools/cures, the profile is bonded/adhered to the substrate.

Figure 13:
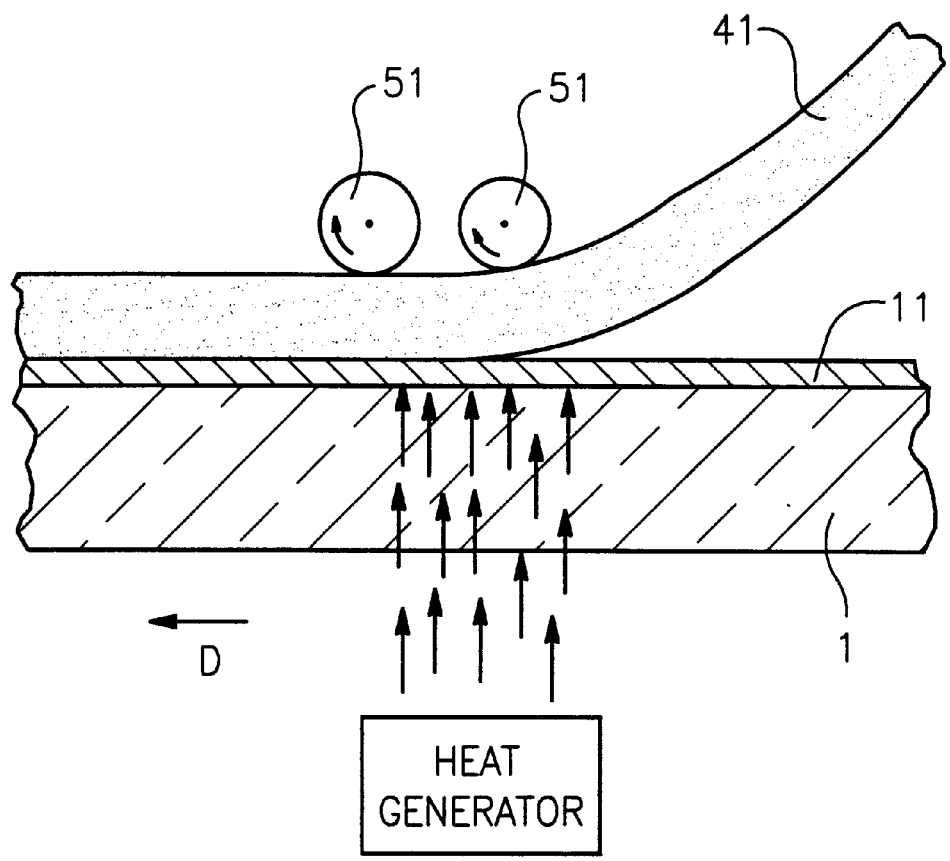
FIG. 13 is a cross sectional view illustrating a method of adhering an extruded (including coextruded in certain embodiments and non-coextruded in other embodiments) frame profile to a substrate in accordance with another embodiment(s) of this invention.

FIG. 13 illustrates another technique for bonding profile 41 to substrate 1 (either directly or via primer layer 11). This technique may be used in conjunction with any of the embodiments shown above regarding any or FIGS. 5, 8, 9, and/or 12. Here, heat is applied to profile 41 at least at the contact point where the profile is touching the substrate 1 (or primer 11). This heat may be localized heat so that the rest of the substrate is not simultaneously heated in certain embodiments of this invention. When heat is being applied at this contact point (or when the profile and/or heat activated adhesive thereof/thereon has been heated), at least one pressing member 51 applies pressure downward on the profile 41 so that the profile may be bonded to the substrate either directly or via primer.

Another embodiment of this invention involves extruding a frame profile (as shown in FIG. 5 or FIG. 12 or FIG. 13) and placing the frame profile on a substrate. Thereafter, when the frame profile is on the substrate, heat (e.g., microwaves) is used to activate the adhesive portion thereby causing the profile to become adhered to the substrate as shown in either of FIGS. 10–11.

While the invention has been described in connection with what is presently considered to be the most practical and preferred embodiments, it is to be understood that the invention is not to be limited to the disclosed embodiments. To the contrary, the invention is intended to cover various modifications and equivalent arrangements included within the spirit and scope of the appended claims.

What is claimed is:

1. A method of making a vehicle window unit, the method comprising:

providing a glass substrate;

extruding a frame profile including a polymer profile portion and a selectively activatable interface or adhesive portion;

allowing the frame profile to cure;

after the curing, but before the frame profile has been bonded to any glass substrate, heating the selectively activatable interface portion of the frame profile in order to activate the interface portion; and pressing the frame profile toward the substrate, or vice versa, proximate an edge thereof when the interface portion is activated in order to adhere or bond the frame profile to the substrate via at least the interface portion thereby forming the vehicle window unit.

2. The method of claim 1, further comprising mounting the vehicle window unit in a window frame of a vehicle using at least an additional adhesive, and wherein the frame profile is bonded or adhered to the substrate with a primer layer being provided therebetween.

3. The method of claim 1, wherein said extruding comprises coextruding so that the polymer profile portion and the selectively activatable interface or adhesive portion are of different materials.

4. The method of claim 1, wherein said extruding comprises extruding the frame profile so that the polymer profile portion and the selectively activatable interface or adhesive portion are of substantially the same material.

5. The method of claim 1, wherein said heating comprises heating the interface or adhesive portion with one of: IR, microwaves, mechanical vibrations, vibration welding, and ultrasonic vibrations.

6. The method of claim 1, wherein the polymer profile portion includes a base portion and a flexible lip portion extending outwardly from the base portion.

7. The method of claim 1, wherein said pressing comprises using a press roller to press the frame profile toward the substrate when the interface or adhesive portion is activated in order to bond the frame profile to the substrate, and wherein said heating comprises heating the selectively activatable adhesive portion of the frame profile at a contact point where the adhesive portion is contacting the substrate or a primer layer thereon in order to activate the adhesive portion.

8. The method of claim 1, wherein said heating comprises heating the selectively activatable interface or adhesive portion of the frame profile when the interface or adhesive portion is contacting the substrate or a primer thereon, in order to activate the interface portion.

9. The method of claim 1, wherein said heating comprises heating the selectively activatable interface or adhesive portion of the frame profile before the interface or adhesive portion contacts the substrate or a primer thereon, in order to activate the interface or adhesive portion before the interface or adhesive portion contacts the substrate or a primer thereon.

10. The method of claim 1, wherein the interface or adhesive portion comprises thermplastic elastomer (TPE).

11. The method of claim 1, wherein the frame profile is bonded or adhered to the substrate via at least the interface portion so that at least a primer layer is provided between the substrate and the frame profile.

12. The method of claim 1, further comprising cutting or trimming at least a portion of the frame profile after the frame profile has cured but prior to said heating.

13. The method of claim 1, wherein said heating comprises heating the interface or adhesive portion to a temperature of from about 150 to 300 degrees C.

14. The method of claim 13, wherein said heating comprises heating the interface or adhesive portion to a temperature of from about 170 to 220 degrees C.

15. A method of making a vehicle window unit, the method comprising:

providing a glass substrate;

extruding a polymer frame profile;

allowing the polymer frame profile to at least partially cure;

after the at least partial curing, but before a part of an interface or adhesive portion of the polymer frame profile has been bonded to any glass substrate and while the part of the interface or adhesive portion is spaced apart from any glass substrate, activating the part of the interface or adhesive portion of the polymer frame profile; and after said activating, adhering or bonding the part of the interface or adhesive portion of the polymer frame profile to the glass substrate using the activated interface or adhesive portion in order to form the vehicle window unit.

16. The method of claim 15, wherein said extruding comprises coextruding the polymer frame profile so that the profile includes a polymer profile portion of a first material and a selectively activatable interface or adhesive portion of a second material different than the first material.

17. The method of claim 15, further comprising installing the window unit into a window frame of a vehicle using at least another adhesive.

18. The method of claim 15, wherein a primer layer is provided on the glass substrate between the glass substrate and the polymer frame profile.

* * * * *